(12) United States Patent
Baker et al.

(10) Patent No.: US 9,173,212 B2
(45) Date of Patent: Oct. 27, 2015

(54) METHOD FOR COMMUNICATING IN A MOBILE NETWORK

(75) Inventors: Matthew P. J. Baker, Canterbury (GB); Timothy J. Moulsley, Caterham (GB); Paul Bucknell, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 297 days.

(21) Appl. No.: 12/933,913

(22) PCT Filed: Mar. 26, 2009

(86) PCT No.: PCT/IB2009/051261
§ 371 (c)(1),
(2), (4) Date: Sep. 22, 2010

(87) PCT Pub. No.: WO2009/118703
PCT Pub. Date: Oct. 1, 2009

(65) Prior Publication Data
US 2011/0021206 A1    Jan. 27, 2011

(30) Foreign Application Priority Data
Mar. 27, 2008   (EP) .................................... 08305074

(51) Int. Cl.
*H04M 3/00*   (2006.01)
*H04W 72/04*   (2009.01)
(Continued)

(52) U.S. Cl.
CPC ........... *H04W 72/042* (2013.01); *H04L 5/0053* (2013.01); *H04L 5/0094* (2013.01); *H04W 88/08* (2013.01); *H04B 7/063* (2013.01); *H04B 7/0617* (2013.01)
USPC ......... 455/418; 455/450; 455/452.2; 370/329

(58) Field of Classification Search
CPC ..... H04W 28/04; H04W 8/245; H04W 72/04; H04W 24/00
USPC ............ 455/418, 450, 452.2; 707/4; 370/329, 370/311
See application file for complete search history.

(56) References Cited
U.S. PATENT DOCUMENTS 6,785,548 B2   8/2004   Moulsley et al.
6,958,989 B1   10/2005  Dick et al.
(Continued)

FOREIGN PATENT DOCUMENTS

EP   1901496 A1   3/2008
EP   1944896 A1   7/2008
(Continued)

OTHER PUBLICATIONS

ZTE: "CCE Allocation Scheme in PDCCH for Efficient Blind Detection": 3GPP TSG-RAN WG1#51, R1-074559, Jeju, Korea, 2007, 3 Page Document.
Ericsson, "Summary of Email Discussion on DL Control Signaling", TSG-RAN WG1 #52, R1-080869, Sosrrento, Italy, Feb. 1-15, 2008, pp. 8-15.
Motorola, "Search Space Definition for L1/L2 Control Channels" 3GPP TSG RAN1#50, R1-073373, Athens Greece, Aug. 20-24, 2007.

*Primary Examiner* — Danh Le

(57) ABSTRACT

The present invention relates to a method for communicating between a primary station and at least one secondary station, comprising configuring each secondary station to search at least one of a plurality of search spaces having a first structure, said first structure consisting of at least a first number of resource sets having a first size, where at least one resource set might be used to transmit a message to the considered secondary station, changing the search space structure to a second structure different from the first structure in response to a signalling message.

51 Claims, 2 Drawing Sheets

(51) Int. Cl.
*H04L 5/00* (2006.01)
*H04W 88/08* (2009.01)
*H04B 7/06* (2006.01)

(56) References Cited

U.S. PATENT DOCUMENTS

| | | | |
|---|---|---|---|
| 8,638,734 B2 | 1/2014 | Baker et al. | |
| 2001/0026547 A1 | 10/2001 | Moulsley et al. | |
| 2004/0043784 A1 | 3/2004 | Czaja et al. | |
| 2006/0067416 A1* | 3/2006 | Tirkkonen et al. | 375/260 |
| 2007/0038615 A1* | 2/2007 | Vadon et al. | 707/4 |
| 2008/0065603 A1* | 3/2008 | Carlson et al. | 707/3 |
| 2008/0273479 A1* | 11/2008 | Kwak et al. | |
| 2009/0088175 A1 | 4/2009 | Pelletier et al. | |
| 2009/0310453 A1 | 12/2009 | Bakx et al. | |
| 2010/0061345 A1 | 3/2010 | Wengerter et al. | |
| 2012/0143757 A1 | 6/2012 | Belamant | |

FOREIGN PATENT DOCUMENTS

| | | |
|---|---|---|
| EP | 1625766 B1 | 10/2008 |
| EP | 1969738 B1 | 3/2014 |
| JP | 2009545091 A | 12/2009 |
| JP | 2010510566 A | 4/2010 |
| JP | 2010516129 A | 5/2010 |
| JP | 2010529757 A | 8/2010 |
| WO | 0173970 A2 | 10/2001 |
| WO | 2007083230 A2 | 7/2007 |
| WO | 2008023943 A1 | 2/2008 |
| WO | 2008157692 A3 | 12/2008 |
| WO | 2009042845 A2 | 4/2009 |

* cited by examiner

METHOD FOR COMMUNICATING IN A MOBILE NETWORK

FIELD OF THE INVENTION

The present invention relates to a method for communicating in a network. More specifically, the present invention relates to communication between a primary station and a secondary station, in a telecommunication network, like a cellular telecommunication network (e.g. UMTS, GSM).

BACKGROUND OF THE INVENTION

In UMTS LTE the downlink control channel PDCCH (Physical Downlink Control Channel) carries information such as resource allocation for uplink or downlink transmission. A PDCCH message can use 1, 2, 4 or 8 Channel Control Elements (CCEs or resource elements)—referred to as CCE aggregation levels 1, 2, 4 or 8.

The UE does not know in advance the location in CCE space of messages intended for it. In principle a UE could attempt to blindly decode all the possible PDCCHs with different starting positions in the CCE space and thus receive any messages intended for that UE. However, if the CCE space is large the processing complexity is prohibitive. Therefore a more limited search is configured which consists of a number of search spaces.

A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station thus can have up to four search spaces. For example, the search space of a UE for aggregation level 1 (referred to as 1-CCE) could consist of the CCEs indexed 3, 4, 5, 6, 7, 8, while its search space for aggregation level 8 could consist of the two resource sets of aggregated CCEs consisting of the CCEs indexed by 1, 2, ..., 8 and 9, 10, ..., 16, respectively. In this example, the UE thus performs six blind decodings for 1-CCEs and two blind decodings for 8-CCEs.

The LTE specification currently requires the UE to perform the following:
  6 decoding attempts of 1-CCE aggregation
  6 decoding attempts of 2-CCE aggregation
  2 decoding attempts of 4-CCE aggregation
  2 decoding attempts of 8-CCE aggregation The larger aggregations are intended to be used for large messages, and/or small messages when a lower code rate is required, for example under bad channel conditions. However, restricting the search spaces to reduce processing complexity limits the availability of suitable aggregations for different conditions as conditions vary.

SUMMARY OF THE INVENTION

It is an object of the invention to propose a method of communication which alleviates the above mentioned problem.

It is another object of the invention to provide a method enabling the search space to be adapted to the situation, without causing more signalling or overhead.

To this end, in accordance with the invention, a method is proposed for communicating between a primary station and at least one secondary station, comprising
  (a) configuring each secondary station to search at least one of a plurality of search spaces having a first structure, said first structure consisting of at least a first number of resource sets having a first size, where at least one resource set might be used to transmit a message to the considered secondary station,
  (b) changing the search space structure to a second structure different from the first structure.

As a consequence, the structure of the search space may be changed in accordance with a particular situation. For instance in case of a change in the transmission characteristics, like the channel conditions, it is possible to change the search space. The channel conditions may change because of new interference sources or because of mobility of a secondary station approaching the cell edge.

The present invention also relates to a primary station comprising means for communicating with at least one secondary station, comprising configuring means for configuring each secondary station to search at least one of a plurality of search spaces having a first structure, said first structure consisting of at least a first number of resource sets having a first size, where at least one resource set might be used to transmit a message to the considered secondary station, and wherein the configuring means are arranged for changing the search space structure to a second structure different from the first structure.

In accordance with still another aspect of the invention, a secondary station is proposed, said secondary station comprising means for communicating with a primary station, said secondary station comprising control means for searching at least one of a plurality of search spaces having a first structure, said first structure consisting of at least a first number of resource sets having a first size, where at least one resource set might be used to transmit a message to the considered secondary station, wherein the control means are arranged for changing the search space structure to a second structure different from the first structure in response to a indication from the primary station of a change in the search space structure.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawing, wherein.

DETAILED DESCRIPTION OF THE INVENTION

The present invention relates to a method for communicating in a network, like a cellular network. For instance, the network may be a UMTS network as depicted on FIG. 1.

Figure 1:
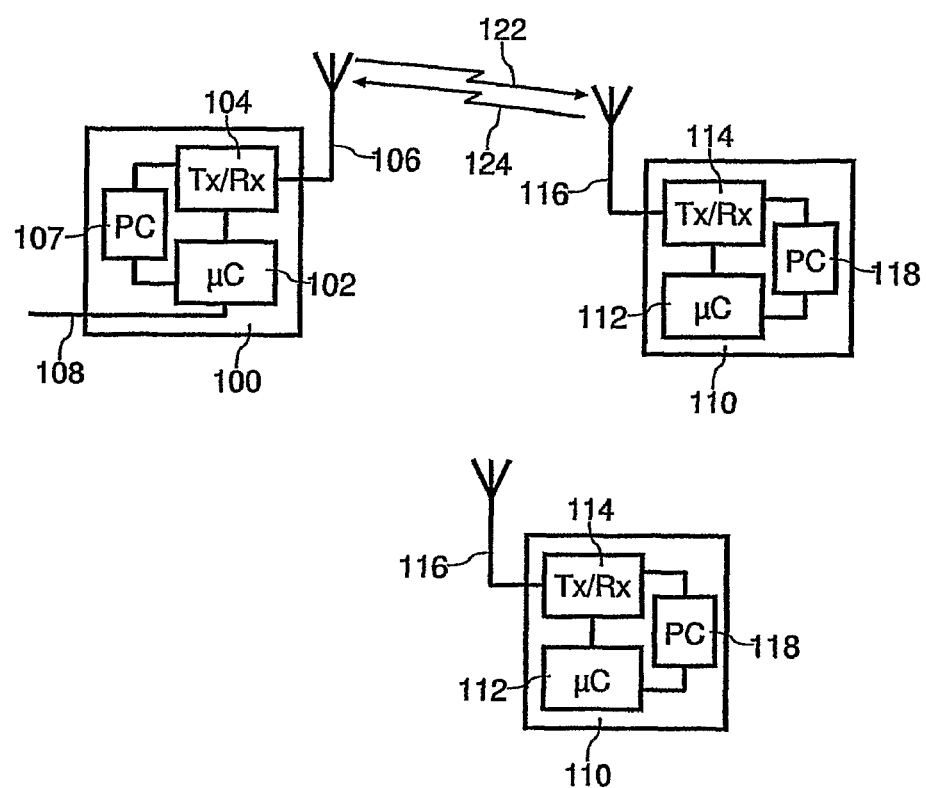
FIG. 1 is a block diagram of a system in accordance with the invention comprising a primary station and at least a secondary station.

Referring to FIG. 1, a radio communication system in accordance with the invention comprises a primary station (BS) 100 and a plurality of secondary stations (MS) 110. The primary station 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from primary station 100 to mobile station 110 takes place on a downlink channel, while communication from secondary station 110 to primary station 100 takes place on an uplink channel.

One of the downlink control channels received by the secondary stations is the PDDCH, where each secondary station has to blindly decode a plurality of sets of CCEs to find which set was allocated to it as set out in the preamble of the description.

In accordance with a first embodiment of the invention, it is assumed that 48 CCEs are available. This corresponds to the illustrative exemplary first embodiment of the invention. Various sets of 48 search spaces for the 1-CCEs have been considered; to each user to which a 1-CCE is to be sent, one of these 48 search spaces is assigned at random (the choice corresponds to the outcome of a hash function of that UE that we model as being uniform over the numbers 1, 2, ..., 48). Each search space consists of six CCEs in this example.

The following sets of search spaces have been considered:
S_1: all search spaces contiguous—i.e. of the form {i,i+1,i+2,i+3,i+4,i+5} with 0≤i≤47 where i is the CCE index, and all elements modulo 48.
S_5: all search spaces of the form {i,i+5,i+10,i+15,i+20,i+25} with 0≤i≤47, and all elements modulo 48.
S_7: all search spaces of the form {i,i+7,i+14,i+21,i+28,i+35} with 0≤i≤47, and all elements modulo 48.
S_d: all search spaces of the form {i,i+1,i+3,i+7,i+12,i+22} with 0≤i≤47, and all elements modulo 48. S_d is designed so that all search spaces overlap in just 1 CCE.
So, for example, the search space of S_5 corresponding to i=25 consists of the CCEs indexed by 25, 30, 35, 40, 45, 2 (as 50 modulo 48 equals 2).

Figure 2:
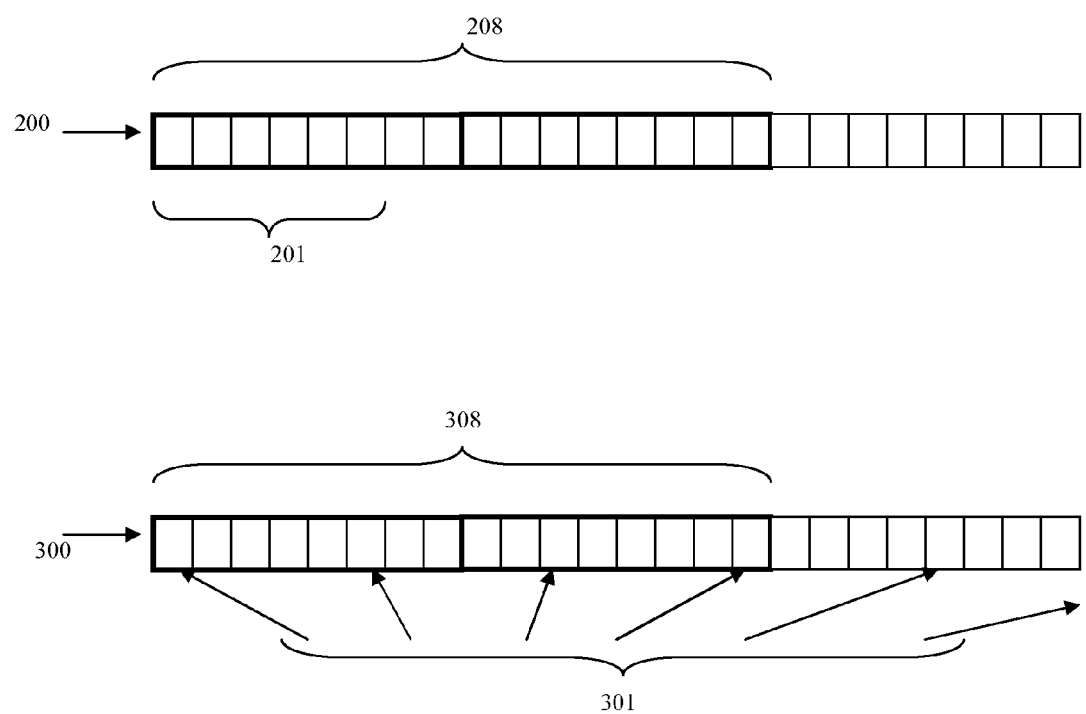
FIG. 2 is a time chart representing the allocated search spaces in accordance an embodiment of the invention.

FIG. 2 illustrates the use of a pattern enabling the number of resource elements in common to be minimized, in accordance with the first embodiment, compared with the prior art. On FIG. 2, a set of available resources 200 are depicted.

In a conventional system, if only sets of 1-CCEs and 8-CCEs are considered, the search space for one secondary station or UE for 8-CCE messages (2 positions 208 are constructed from contiguous groups of CCEs) is depicted on FIG. 2. The positions 201 of 1-CCE messages (6 contiguous positions) are such that it is likely that all possible positions are blocked if another UE is receiving an 8-CCE message.

In accordance with the first embodiment of the invention, the set of available resources 300 comprises search space for one UE for 8-CCE messages 308, as on FIG. 2 where 2 positions are constructed from contiguous groups of CCEs. Regarding the search space for a UE for 1-CCE messages, 6 non-contiguous positions 301 are represented. These positions are non contiguous, so that they reduce overlap with higher aggregation-level search space and therefore increase likelihood that a position can be found to send a small message.

A fixed set of search spaces can be a good compromise for typical situations. However, in some cases, for example where a secondary station or a UE near the cell border experiences bad channel conditions over an extended period, it would be advantageous to modify the search spaces to allow more blind decodings for 4 and 8-CCEs, like in a first variant of the first embodiment of the invention, and fewer for 1-CCE.

For example:
2 decoding attempts of 1-CCE aggregation
2 decoding attempts of 2-CCE aggregation
6 decoding attempts of 4-CCE aggregation
6 decoding attempts of 8-CCE aggregation This modification could be carried out using explicit RRC signalling. However, other solutions are of interest, for example with lower signalling overhead.

One aspect of the invention is to re-configure the search spaces implicitly, based on other changes in the UE mode or configuration. These changes could be indicated by RRC signalling or otherwise. As an example, a change of the transmission rate or the selection of a particular modulation scheme induces the selection of another search space in accordance with this variant of the invention. Indeed, in case the transmission rate is lowered, it implies that the transmission conditions have been deteriorated. Thus, this variant avoids to transmit an explicit message for changing the search space, the secondary station carries out the change from the modification of the transmission characteristic. For each applicable UE mode there is a default set of search spaces.

We assume, as an example, that the default search spaces are configured as follows:
6 decoding attempts of 1-CCE aggregation
6 decoding attempts of 2-CCE aggregation
2 decoding attempts of 4-CCE aggregation
2 decoding attempts of 8-CCE aggregation In one embodiment the invention is applied in LTE to modify the PDCCH search spaces. If the UE reports channel quality less than a certain threshold, then the search spaces could be modified to:
2 decoding attempts of 1-CCE aggregation
2 decoding attempts of 2-CCE aggregation
6 decoding attempts of 4-CCE aggregation
6 decoding attempts of 8-CCE aggregation In a further embodiment the invention is applied in LTE to modify the PDCCH search spaces when the UE is configured to use UE-specific reference symbols. The configuration of UE-specific reference symbols is likely to imply that UE-specific beamforming is being used, and UE-specific beamforming is most likely to be applied at the cell border with poor SINR. Also, if beamforming is applied to data, this would make it desirable that the PDCCH is made more robust, in order to match the extended coverage of the data transmission. As an example the following could apply when beamforming is used:
2 decoding attempts of 1-CCE aggregation
2 decoding attempts of 2-CCE aggregation
6 decoding attempts of 4-CCE aggregation
6 decoding attempts of 8-CCE aggregation A refinement would be to limit the set of different message formats which are blindly decoded for each aggregation size, and apply different limits depending on the UE configuration. For example if MIMO is not supported in beamforming mode (or when UE-specific reference symbols are configured), then it would not be necessary to blindly decode message formats designed for MIMO operation.

A further embodiment could adapt the search space depending on UE capabilities—for example if a UE does not support MIMO (e.g. due to a limitation in the number of physical antennas), message formats designed for MIMO operation would be implicitly excluded from the search. The same would be true if a UE supporting MIMO was configured not to operate in MIMO mode (e.g. by network signalling).

As an example the following could apply for a UE which did not support MIMO:
8 decoding attempts of 1-CCE aggregation
6 decoding attempts of 2-CCE aggregation
1 decoding attempts of 4-CCE aggregation
1 decoding attempts of 8-CCE aggregation In a further embodiment the UE may be configured to use semi-persistent scheduling. In this case the same resource allocation is understood to apply periodically. RRC signalling indicates the period. Some PDCCH messages may configure the resource. Such messages may be identified by one or more of:

- a different ID (CRNTI) from that used for normal messages.
- Different scrambling from that used for normal messages
- Different HARQ processes from those indicated by normal messages
- Different Incremental Redundancy Versions from those indicated by normal messages
- Different Modulation and Coding Scheme from those indicated by normal messages
- An extra bit In that case the following search spaces could be used for each of the two CRNTIs:

- 3 decoding attempts of 1-CCE aggregation
- 3 decoding attempts of 2-CCE aggregation
- 1 decoding attempts of 4-CCE aggregation
- 1 decoding attempts of 8-CCE aggregation As a refinement the modified search space may only be applicable in certain subframes, for example, the subframes where a persistent resource allocation is applicable.

As a further refinement the search space could revert to the default one following a cell change (handover), or a further change of the transmission characteristic.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for a primary station to communicate in a network, with at least one secondary station, the method comprising:
   at the primary station:
   configuring via a controller, the at least one secondary station to search a search space of a plurality of search spaces each having a search space structure, the searching comprising searching at least one of the plurality of search spaces to find messages transmitted to the at least one secondary station; and
   transmitting to the at least one secondary station, via a transceiver and an antenna on a downlink channel, a message comprising an indication of a change of the search space to be searched by the at least one secondary station, in response to a change in a communication condition of the network,
   wherein changing of the search space to be searched by the secondary station comprises changing from searching a first search space having a first search space structure to searching a second search space having a second search space structure that is different from the first search space structure in response to the indication in the message,
   and wherein the first search space structure comprises at least a first number of resource sets having a first size, at least one resource set of the first number of resource sets is for transmitting a message to the at least one secondary station.

2. The method of claim 1, wherein the indication in the message provided by the primary station, regarding the change in a communication condition of the network indicates a change in a transmission quality of a transmission channel.

3. The method of claim 1, wherein the indication in the message provided by the primary station, regarding the change in a communication condition of the network, indicates a change in transmission mode.

4. The method of claim 3, wherein the change in transmission mode comprises a change in a beamforming mode.

5. The method of claim 4, wherein the change in the beamforming mode comprises a change in a specific beamforming parameter.

6. The method of claim 5, wherein the change in the specific beamforming parameter comprises an indication of a type of pilot signal.

7. The method of claim 1, wherein the message is a signal from the primary station regarding an allocation of resource.

8. The method of claim 7, wherein the allocation of resource is an allocation for a dynamic scheduling or a semi-persistent scheduling.

9. The method of claim 1, wherein the second search space structure is selected depending on capabilities of the secondary station.

10. The method of claim 1, wherein the second search space structure comprises at least a second number of resource sets having the first size; and
    wherein the second number of resource sets is different from the first number of resource sets.

11. The method of claim 1, wherein the first search space structure comprises a third number of resource sets having a second size; wherein the second search space structure comprises at least a second number of resource sets having the first size, and a fourth number of resource sets having the second size; and wherein the second number of resource sets is smaller than the first number of resource sets, and wherein the fourth number of resource sets is larger than the third number of resource sets.

12. The method of claim 1, wherein the indication in the message indicates a change in a transmission characteristic.

13. A secondary station configured to communicate in a network the secondary station comprising:
    a controller configured to search in a search space of a plurality of search spaces each having a search space structure, the searching comprising searching at least one of the plurality of search spaces to find messages transmitted to the secondary station; and
    a transceiver and an antenna configured to receive a message, from a primary station through a downlink channel,
    wherein the controller is configured to change from searching a first search space having a first search space structure to searching a second search space having a second search space structure that is different from the first search space structure in response to an indication in the message of a change in the search space structure to search, the change in search space structure being based on a change in a communication condition of the network,
    and wherein the first search space structure comprises at least a first number of resource sets having a first size, at least one resource set of the first number of resource sets is for transmitting a message to the at least one secondary station.

14. The secondary station of claim 13, wherein the indication in the message provided from the primary station indicates a change in the transmission quality of a transmission channel.

15. The secondary station of claim 13, wherein the indication in the message provided from the primary station indicates a change in transmission mode.

16. The secondary station of claim 15, wherein the change in transmission mode comprises a change in a beamforming mode.

17. The secondary station of claim 16, wherein the change in the beamforming mode comprises a change in a specific beamforming parameter.

18. The secondary station of claim 17, wherein the specific beamforming parameter comprises an indication of a type of pilot signal.

19. The secondary station of claim 13, wherein the message from the primary station indicates an allocation of resource.

20. The secondary station of claim 19, wherein the allocation of resource is an allocation for a dynamic scheduling or a semi-persistent scheduling.

21. The secondary station of claim 13, wherein the controller is configured to transmit to the primary station, through the transceiver and an uplink channel, a message comprising an indication of a capability of the secondary station, and the controller is configured to configure the secondary station by changing the search space structure to search based on the capability of the secondary station.

22. The secondary station of claim 13, wherein the second search space structure comprises at least a second number of resource sets having the first size; and wherein the second number of resource sets is different from the first number of resource sets.

23. The secondary station of claim 13, wherein the first search space structure comprises a third number of resource sets having a second size; wherein the second search space structure comprises a second number of resource sets having the first size, and a fourth number of resource sets having the second size; and wherein the second number of resource sets is smaller than the first number of resource sets, and the fourth number of resource sets is larger than the third number of resource sets.

24. The secondary station of claim 13, wherein the indication in the message indicates a change in a transmission characteristic.

25. The secondary station of claim 13, wherein the controller is configured to transmit a message through the transceiver and antenna on an uplink channel, to the primary station, indicating a change in a communication condition of the network, regarding a transmission quality of a channel.

26. The secondary station of claim 13, wherein the controller is configured to transmit a message through the transceiver and antenna on an uplink channel, to the primary station, indicating a change in a communication condition of the network, regarding a preferred transmission mode.

27. The secondary station of claim 13, wherein the downlink channel from which the message is received is a Physical Downlink Control Channel (PDCCH).

28. The secondary station of claim 13, wherein changing the search space structure to be searched comprises one of modifying the first search space structure to produce the second search space structure or changing the selection of the search space structure to be searched, from the first search space structure to a different second search space structure.

29. The secondary station of claim 13, wherein messages are configured to be received by the secondary station using resources within a resource set, and wherein a resource set comprises aggregated CCEs, a search space is a resource set of aggregated CCEs, each CCE is identified by an index, and a search space structure is a plurality of search spaces comprising a number of indexed resource sets of aggregated CCEs.

30. A primary station for communicating in a network, the primary station comprising:
    a controller configured to configure at least one secondary station to search in a search space of a plurality of search spaces each having a search space structure, the searching comprising searching at least one of the plurality of search spaces to find messages transmitted to the at least one secondary station; and
    a transceiver and antenna configured to transmit, on a downlink channel, a message including an indication for changing the search space to be searched by the at least one secondary station in response to a change in communication condition of the network, wherein changing the search space to be searched comprises changing from searching a first search space having a first search space structure to searching a second search space having a second search space structure that is different from the first search space structure,
    and wherein the first structure comprises at least a first number of resource sets having a first size, at least one resource set of the first number of resource sets is for transmitting a message to the at least one secondary station.

31. The primary station of claim 30, wherein the indication in the message provided to the secondary station, regarding the change in the communication condition of the network, indicates a change in the transmission quality of a transmission channel.

32. The primary station of claim 30, wherein the indication in the message provided by the primary station, regarding the change in a communication condition of the network, indicates a change in transmission mode.

33. The primary station of claim 32, wherein the change in transmission mode comprises a change in a beamforming mode.

34. The primary station of claim 33, wherein the change in the beamforming mode comprises a change in a specific beamforming parameter.

35. The primary station of claim 34, wherein the specific beamforming parameter comprises an indication of a type of pilot signal.

36. The primary station of claim 30, wherein the message provided to the secondary station indicates an allocation of resource.

37. The primary station of claim 36, wherein the allocation of resource is an allocation for a dynamic scheduling or a semi-persistent scheduling.

38. The primary station of claim 30, wherein the controller is configured to receive from the secondary station, through the transceiver and an uplink channel, a message comprising an indication of a capability of the secondary station, and the controller is configured to configure the secondary station by changing the search space structure to search based on the capability of the secondary station.

39. The primary station of claim 30, wherein the second search space structure comprises at least a second number of resource sets having the first size; and wherein the second number of resource sets is different from the first number of resource sets.

40. The primary station of claim 30, wherein the first search space structure comprises a third number of resource sets having a second size; wherein the second search space structure comprises at least a second number of resource sets having the first size, and a fourth number of resource sets having the second size; and wherein the second number of resource sets is smaller than the first number of resource sets, and the fourth number of resource sets is larger than the third number of resource sets.

41. The primary station of claim 30, wherein the indication in the message indicates a change in a transmission characteristic.

42. The primary station of claim 30, wherein the controller is configured to receive a message through the antenna and transceiver over an uplink channel, from the secondary station, indicating a change in a communication condition of the network, regarding a transmission quality of a channel.

43. The primary station of claim 30, wherein the controller is configured to receive a message through the antenna and transceiver over an uplink channel, from the secondary station, indicating a change in a communication condition of the network, regarding a preferred transmission mode.

44. The secondary station of claim 26, wherein the transmission mode comprises a beamforming mode.

45. The primary station of claim 43, wherein the transmission mode comprises a beamforming mode.

46. The primary station of claim 30, wherein the downlink channel through which the secondary station is configured is a Physical Downlink Control Channel (PDCCH).

47. The primary station of claim 30, wherein changing the search space structure to be searched comprises one of modifying the first search space structure to produce the second search space structure or changing the selection of search space structure to be searched, from the first search space structure to a different second search space structure.

48. The primary station of claim 30, wherein messages are configured to be transmitted to the secondary station using resources within a resource set, and wherein a resource set comprises aggregated CCEs, a search space comprises a set of aggregated CCEs, and a search space structure is a plurality of search spaces comprising a number of indexed resource sets of aggregated CCEs.

49. A method for a secondary station to communicate in a network, with a primary station, the method comprising:
in the secondary station:
searching via a controller in a search space of a plurality of search spaces each having a search space structure, the searching comprising searching in at least one of the plurality of search spaces for messages transmitted to the at least one secondary station;
receiving through a transceiver and antenna on a downlink channel, from the primary station, a message comprising an indication to change the search space to be searched, the change in search space to be searched being based on a change in a communication condition of the network; and
changing from searching a first search space having a first search space structure to searching a second search space having a second search space structure different from the first search space structure,
wherein the first search space structure comprises at least a first number of resource sets having a first size, at least one resource set of the first number of resource sets is for transmitting a message to the at least one secondary station.

50. A tangible non-transitory computer-readable storage medium having stored thereon control information including instructions that when executed by processing circuitry of a primary station are configured to:
configure via a controller, the at least one secondary station to search in a search space of a plurality of search spaces each having a search space structure, the searching comprising searching at least one of the plurality of search spaces to find messages transmitted to the at least one second station; and
transmit via a transceiver and an antenna on a downlink channel, to the at least one secondary station, a message comprising an indication of a change of the search space to be searched by the at least one secondary station, in response to a change in a communication condition of the network
wherein changing of the search space to be searched comprises changing from searching a first search space having a first search space structure to searching a second search space having a second search space structure that is different from the first structure, in response to the indication in the message,
and wherein the first search space structure comprises at least a first number of resource sets having a first size, and at least one resource set of the first number of resource sets is for transmitting a message to the at least one secondary station.

51. A tangible non-transitory computer-readable storage medium having stored thereon control information including instructions that when executed by processing circuitry of a secondary station are configured to:
search via a controller in a search space of a plurality of search spaces each having a search space structure, the searching comprising searching in at least one of the plurality of search spaces for messages transmitted to the secondary station; and
receive through a transceiver and an antenna on a downlink channel, from the primary station, a message comprising an indication to change a search space to be searched, the indication being based on a change in a communication condition of the network; and
change from searching a first search space having a first search space structure to searching a second search space having a second search space structure different from the first search space structure,
wherein the first search space structure comprising at least a first number of resource sets having a first size, at least one resource set of the first number of resource sets is for transmitting a message to the at least one secondary station.

* * * * *